United States Patent
Kuki

(10) Patent No.: US 9,875,695 B2
(45) Date of Patent: Jan. 23, 2018

(54) DISPLAY DEVICE

(71) Applicant: Sharp Kabushiki Kaisha, Osaka-shi, Osaka (JP)

(72) Inventor: Hikaru Kuki, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 156 days.

(21) Appl. No.: 14/896,480

(22) PCT Filed: Feb. 24, 2014

(86) PCT No.: PCT/JP2014/054394
§ 371 (c)(1),
(2) Date: Dec. 7, 2015

(87) PCT Pub. No.: WO2014/199666
PCT Pub. Date: Dec. 18, 2014

(65) Prior Publication Data
US 2016/0133197 A1    May 12, 2016

(30) Foreign Application Priority Data
Jun. 13, 2013    (JP) .................. 2013-124913

(51) Int. Cl.
*G09G 5/00*    (2006.01)
*G09G 3/34*    (2006.01)
(Continued)

(52) U.S. Cl.
CPC .......... *G09G 3/3406* (2013.01); *G06F 3/013* (2013.01); *G09G 3/2018* (2013.01);
(Continued)

(58) Field of Classification Search
CPC .. G09G 3/3406; G09G 3/3648; G09G 3/3688; G09G 3/2018; G09G 2300/08; G09G 2310/08; G09G 2320/08; G09G 2320/0626; G09G 2330/021; G06F 3/013
See application file for complete search history.

(56) References Cited

U.S. PATENT DOCUMENTS 8,866,860 B2 * 10/2014 Nakayama .............. G06F 3/013
345/212
9,104,408 B2 * 8/2015 Oba ...................... G06F 1/3203
(Continued)

FOREIGN PATENT DOCUMENTS

JP    9-120323 A    5/1997
JP    9-190245 A    7/1997
(Continued)

OTHER PUBLICATIONS

Official Communication issued in International Patent Application No. PCT/JP2014/054394, dated Apr. 15, 2014.

*Primary Examiner* — Vijay Shankar
(74) *Attorney, Agent, or Firm* — Keating & Bennett, LLP

(57) ABSTRACT

A display device uses a control unit to analyze an image obtained by picturing a user using an image-capturing unit and detect a line of sight of the user with respect to the display region of a display unit. Further, the control unit identifies observation condition information indicating the condition of the user viewing the display region based on the detected line of sight of the user. A display control unit writes the image signal in the display region of the display unit for each frame, wherein the display control unit halts, for a predetermined frame period, writing of the image signal in a controlled region when the identified observation condition information meets a predetermined requirement, the controlled region being at least a part of the display region.

10 Claims, 8 Drawing Sheets

(51) Int. Cl.
  *G09G 3/36* (2006.01)
  *G06F 3/01* (2006.01)
  *G09G 3/20* (2006.01)

(52) U.S. Cl.
  CPC ......... *G09G 3/3648* (2013.01); *G09G 3/3688* (2013.01); *G09G 2300/0426* (2013.01); *G09G 2300/08* (2013.01); *G09G 2310/08* (2013.01); *G09G 2320/0626* (2013.01); *G09G 2320/08* (2013.01); *G09G 2330/021* (2013.01)

(56) References Cited

U.S. PATENT DOCUMENTS

| | | | |
|---|---|---|---|
| 9,165,525 B2* | 10/2015 | Kobayashi | G09G 3/3648 |
| 9,368,053 B2* | 6/2016 | Koyama | G09G 3/20 |
| 2011/0135114 A1 | 6/2011 | Oba et al. | |
| 2012/0062529 A1 | 3/2012 | Koyama | |
| 2013/0106921 A1 | 5/2013 | Nakayama | |
| 2014/0028657 A1 | 1/2014 | Kobayashi et al. | |

FOREIGN PATENT DOCUMENTS

| | | |
|---|---|---|
| JP | 2005-91571 A | 4/2005 |
| JP | 2007-36702 A | 2/2007 |
| JP | 2009-118072 A | 5/2009 |
| JP | 2012-63899 A | 3/2012 |
| JP | 2012-256012 A | 12/2012 |
| WO | 2010/021373 A1 | 2/2010 |
| WO | 2012/137799 A1 | 10/2012 |

* cited by examiner

|  | NUMBER OF TIMES MOVEMENT OCCURS (M) | | |
|---|---|---|---|
|  | ONCE | TWICE | THREE TIMES |
| 0≦T<5s | PATTERN D | PATTERN C | PATTERN B |
| 5<T≦10s | PATTERN C | PATTERN B | PATTERN A |
| 10<T≦30s | PATTERN B | PATTERN A | PATTERN A |
| 30<T≦60s | PATTERN A | PATTERN A | PATTERN A |

(AVERAGE STAY TIME (T))

|  | NUMBER OF TIMES MOVEMENT OCCURS (M) | | |
|---|---|---|---|
|  | ONCE | TWICE | THREE TIMES |
| AVERAGE STAY TIME (T) 0≦T＜5s | PATTERN C | PATTERN B | PATTERN A |
| 5＜T≦10s | PATTERN B | PATTERN A | PATTERN E |
| 10＜T≦30s | PATTERN A | PATTERN E | PATTERN E |
| 30＜T≦60s | PATTERN E | PATTERN E | PATTERN E |

DISPLAY DEVICE

TECHNICAL FIELD

The present invention relates to a display device and, more particularly, to a technique for controlling display depending on the condition of a user viewing the display screen.

BACKGROUND ART

JP Hei09(1997)-120323 A discloses a technique for reducing power consumption according to the use condition of the electronic device. According to JP Hei09(1997)-120323 A, a line of sight of a user is detected from an image obtained by picturing the user using the electronic device and the tilt of the electronic device is detected, and the power supply of the electronic device is controlled depending on the detected parameters. More specifically, according to JP Hei09(1997)-120323 A, if the line of sight of the user is not in the direction of the electronic device and the electronic device has been tilted by a certain amount or more for a certain period of time or longer, power supply to the display control unit of the electronic device is stopped and the backlight is turned off. That is, according to JP Hei09(1997)-120323 A, an image is displayed when the user is viewing the display screen, and no image is displayed when the user is not viewing the display screen.

DISCLOSURE OF THE INVENTION

Problems to be Solved by the Invention

When the user sometimes glances at the screen of the display device, controlling display according to JP Hei09 (1997)-120323 A causes the screen to be switched between display states too often such that the screen may flicker or the time between switches between the display conditions of the screen may vary significantly. That is, merely switching display on the screen depending on whether the user is viewing the screen may not enable controlling display in a fine manner depending on the condition of the user viewing the screen, meaning low visibility or convenience.

An object of the present invention is to provide a technique for controlling display in a manner suitable for the condition of the user viewing the screen without decreasing visibility or convenience.

Means to Solve the Problems

A display device according to a first invention includes: a display unit having a display region in which an image signal is written; a detection unit configured to analyze an image obtained by picturing a user and detect a line of sight of the user with respect to the display region; an identification unit configured to identify observation condition information indicating a condition of the user viewing the display region based on the line of sight detected by the detection unit; and a display control unit configured to write the image signal in the display region for each frame, wherein the display control unit halts, for a predetermined frame period, writing of the image signal in a controlled region when the observation condition information identified by the identification unit meets a predetermined requirement, the controlled region being at least a part of the display region.

According to a second invention, starting from the first invention, the display control unit changes a length of the predetermined frame period depending on the observation condition information.

According to a third invention, starting from the first or second invention, the controlled region is a static image region of the display region in which a static image contained in an image represented by the image signal is displayed.

According to a fourth invention, starting from one of the first to third inventions, the observation condition information includes at least one of a number of times the line of sight of the user directed to the display region moves per unit time and a time for which the user views the display region within a unit time, and the predetermined requirement is the observation condition information having a value equal to or smaller than a predetermined threshold.

According to a fifth invention, starting from one of the first to third inventions, the identification unit further identifies a predetermined observed range including an observed position within the display region to which the line of sight of the user is directed, the observation condition information includes at least one of a number of times the line of sight of the user directed to the display region moves per unit time and a time for which the user views the display region within a unit time, the controlled region is a portion of the display region that is other than the predetermined observed range, and the predetermined requirement is the observation condition information having a value equal to or smaller than a predetermined threshold.

Starting from the fourth or fifth invention, a sixth invention further includes: a backlight configured to illuminate the display unit with light; and a backlight control unit configured to reduce a luminance of the backlight when the observation condition information has a value that is equal to or smaller than the predetermined threshold.

According to a seventh invention, starting from the first invention, the observation condition information includes an observed position in the display region to which the line of sight of the user is directed, and the predetermined requirement is a movement of the observed position within the display region matching a predetermined movement pattern.

According to an eighth invention, starting from one of the first to seventh inventions, the display unit includes an active-matrix substrate, the active-matrix substrate including: gate lines and source lines disposed to cross the gate lines; pixel electrodes each provided for a pixel defined by one of the gate lines and one of the source lines; and thin-film transistors each having a semiconductor layer provided above one of the gate lines, a gate terminal connected with that gate line, a source terminal connected with one of the source lines, and a drain terminal connected with one of the pixel electrodes, the source terminal and the drain terminal being located above the semiconductor layer and spaced apart from each other.

According to a ninth invention, starting from the eight invention, the semiconductor layer contains an oxide semiconductor.

According to a tenth invention, starting from the ninth invention, the oxide semiconductor contains indium, gallium, zinc and oxygen.

According to an eleventh invention, starting from the tenth invention, the oxide semiconductor is crystalline.

The arrangement of the present invention enables controlling display in a manner suitable for the condition of the user viewing the screen without decreasing visibility or convenience

EMBODIMENTS FOR CARRYING OUT THE INVENTION

Figure 1:
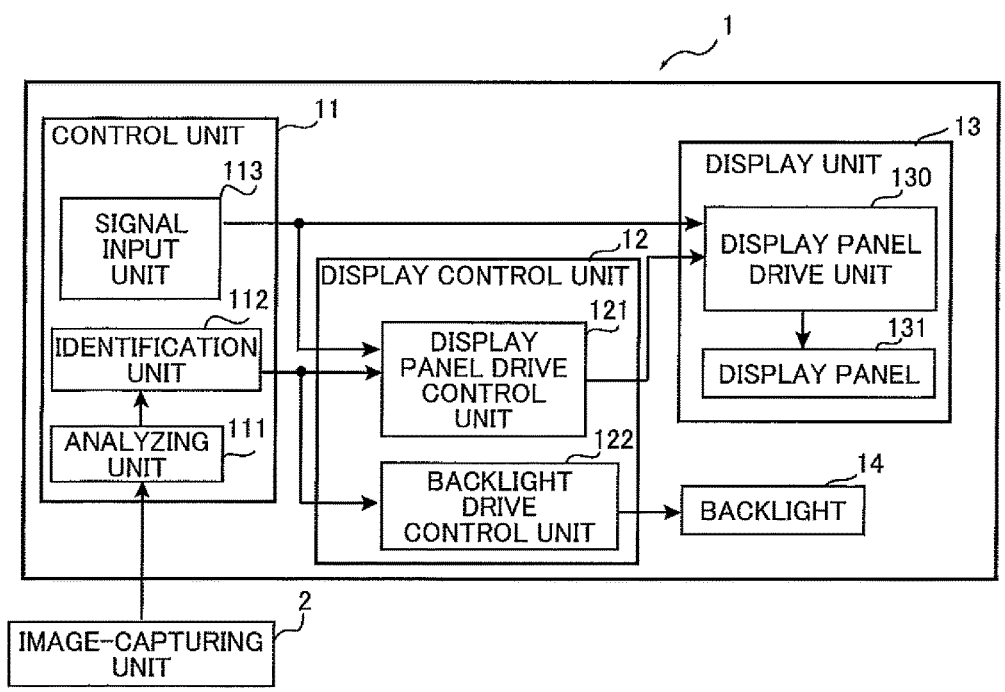
FIG. 1 is a schematic block diagram of a display device in a first embodiment.

A display device in an embodiment of the present invention includes: a display unit having a display region in which an image signal is written; a detection unit configured to analyze an image obtained by picturing a user and detect a line of sight of the user with respect to the display region; an identification unit configured to identify observation condition information indicating a condition of the user viewing the display region based on the line of sight detected by the detection unit; and a display control unit configured to write the image signal in the display region for each frame, wherein the display control unit halts, for a predetermined frame period, writing of the image signal in a controlled region when the observation condition information identified by the identification unit meets a predetermined requirement, the controlled region being at least a part of the display region (first arrangement).

In the first arrangement, the detection unit detects a line of sight of the user with respect to the display region from an image obtained by picturing the user, and the identification unit identifies observation condition information about the user with respect to the display region based on the detected line of sight. The display control unit writes an image represented by image signals in the display region for each frame, and halts, for a predetermined frame period, writing of image signals in a controlled region when the observation condition information about the user meets a predetermined requirement, the controlled region being at least a part of the display region. Writing of image signals in at least part of the display region is halted for a predetermined frame period depending on the condition of the user viewing the display region, but images are displayed on the display region. Thus, the decrease in the visibility of images or convenience will be smaller than in implementations where images are displayed only when the viewer is viewing the screen. Further, halting for a predetermined frame period writing of image signals in at least a part of the display region will reduce power consumption encountered when images are displayed.

In a second arrangement, starting from the first arrangement, the display control unit may change a length of the predetermined frame period depending on the observation condition information.

In the second arrangement, the predetermined frame period can be changed depending on the observation condition information about the user. This will enable controlling display in a manner that is more suitable for the condition of the user viewing the display region compared with implementations where the predetermined frame period is constant, thereby further reducing power consumption encountered when images are displayed.

In a third arrangement, starting from the first or second arrangement, the controlled region may be a static image region of the display region in which a static image contained in an image represented by the image signal is displayed.

In the third arrangement, writing of image signals in a still image region may be halted for a predetermined frame period. Still images contain less movement than moving images, and thus visibility is less likely to decrease even when writing of image signals in a still image region is halted for a predetermined frame period. Further, since an image is also displayed in the still image region such that power consumption will be reduced without making the user noticing something odd.

In a fourth arrangement, starting from one of the first to third arrangements, the observation condition information may include at least one of a number of times the line of sight of the user directed to the display region moves per unit time and a time for which the user views the display region within a unit time, and the predetermined requirement may be the observation condition information having a value equal to or smaller than a predetermined threshold.

In the fourth arrangement, the condition of the user viewing the display region may be identified based on at least one of the number of times the line of sight directed to the display region moves per unit time and the time for which the line of sight is directed to the display region within a unit time. Further, when the observation condition information has a value that is equal to or smaller than a predetermined threshold, writing of image signals in the controlled region is halted for a predetermined frame period. This will enable controlling display in a manner more suitable for the condition of the user than in implementations where writing of image signals is halted depending on whether the user views the display region.

In a fifth arrangement, starting from one of the first to third arrangements, the identification unit may further identify a predetermined observed range including an observed position within the display region to which the line of sight of the user is directed, the observation condition information may include at least one of a number of times the line of sight of the user directed to the display region moves per unit time and a time for which the user views the display region within a unit time, the controlled region may be a portion of the display region that is other than the predetermined observed range, and the predetermined requirement may be the observation condition information having a value equal to or smaller than a predetermined threshold.

In the fifth arrangement, the condition of the user viewing the display region may be identified based on at least one of the number of times the line of sight directed to the display region moves per unit time and the time for which the line of sight is directed to the display region within a unit time. Further, when the observation condition information has a value that is equal to or smaller than a predetermined threshold, writing of image signals in the portions of the display region that are other than the observed range for the user is halted for a predetermined frame period. Thus, an image signal is written in the observed range that the user is viewing for each frame, and thus power consumption encountered while an image is displayed will be reduced without decreasing the visibility of images in the observed range or decreasing convenience.

Starting from the fourth or fifth arrangement, a sixth arrangement may further include: a backlight configured to illuminate the display unit with light; and a backlight control unit configured to reduce a luminance of the backlight when the observation condition information has a value that is equal to or smaller than the predetermined threshold.

In the sixth arrangement, the luminance of the backlight is reduced when the observation condition information about the user has a value that is equal to or smaller than the predetermined threshold, thereby further reducing power consumption encountered while an image is displayed.

In a seventh arrangement, starting from the first arrangement, the observation condition information may include an observed position in the display region to which the line of sight of the user is directed, and the predetermined requirement may be a movement of the observed position within the display region matching a predetermined movement pattern.

In the seventh arrangement, when a movement of the observed position of the user matches a predetermined movement pattern, writing of image signals in the controlled region is halted for a predetermined frame period. A movement of the observed position of the user reflects the condition of the user viewing the display region. This will enable controlling display in a manner more suitable for the condition of the user viewing the display region.

In an eighth arrangement, starting from one of the first to seventh arrangements, the display unit may include an active-matrix substrate, the active-matrix substrate including: gate lines and source lines disposed to cross the gate lines; pixel electrodes each provided for a pixel defined by one of the gate lines and one of the source lines; and thin-film transistors each having a semiconductor layer provided above one of the gate lines, a gate terminal connected with that gate line, a source terminal connected with one of the source lines, and a drain terminal connected with one of the pixel electrodes, the source terminal and the drain terminal being located above the semiconductor layer and spaced apart from each other.

In a ninth arrangement, starting from the eight arrangement, the semiconductor layer may contain an oxide semiconductor.

In a tenth arrangement, starting from the ninth arrangement, the oxide semiconductor may contain indium, gallium, zinc and oxygen.

In an eleventh arrangement, starting from the tenth arrangement, the oxide semiconductor may be crystalline.

Now, embodiments of the present invention will be described in detail with reference to the drawings. The same or corresponding components in the drawings are labeled with the same characters and their description will not be repeated.

<First Embodiment>
(Construction)

FIG. 1 is a schematic block diagram of a display device in the present embodiment. The display device 1 includes a control unit 11, a display control unit 12, a display unit 13, and a backlight 14. The display device 1 is electrically connected with an image-capturing unit 2 that is externally provided. These components will be described in detail below.

The image-capturing unit 2 may include an electronic camera, for example. The electronic camera is located at a position on the display screen of the display device 1 that may be viewed by a user, and is mounted on the display device 1 so as to picture the face of the user. The image-capturing unit 2 is controlled by the control unit 11, discussed below, and provides image signals representing an image obtained by picturing the face of the user (hereinafter referred to as analysis image signals) to the control unit 11.

The control unit 11 includes an analyzing unit 111, an identification unit 112, and a signal input unit 113. The control unit 11 includes a central processing unit (CPU), not shown, and memories (i.e. read-only memory (ROM) and random-access memory (RAM)). The control unit 11 performs the functions of the analyzing unit 111, identification unit 112 and signal input unit 113 as the CPU executes a control program stored in the ROM. These components will be described below.

The analyzing unit 111 causes the image-capturing unit 2 to capture images at regular intervals to acquire analysis image signals from the image-capturing unit 2. The analyzing unit 111 analyzes the analysis image signals to detect a line of sight of the user. More specifically, the analyzing unit 111 detects a face region of the user in an image represented by the analysis image signals based on a predetermined pattern image. The pattern image predefines the positions of various parts of the face (i.e. eyes, nose and mouth) and color information (i.e. luminance and chroma), for example. The analyzing unit 111 pattern-matches a pattern image with the image represented by the analysis image signals to detect the face region and the positions of the eyes (i.e. eye coordinates) of the user in the image. Further, the analyzing unit 111 identifies the position of the center of an eye ball (i.e. reference coordinates) in each of the eye portions based on the curvature of the eye ball, and extracts a pupil portion from the portions of the image that correspond to the eye to detect the position of the center of its pupil (i.e. pupil coordinates). The analyzing unit 111 detects the direction running from the eye ball centers (i.e. reference coordinates) to the pupil centers (i.e. pupil coordinates) as a sight line vector. The analyzing unit 111 provides sight line information indicating the positions of the eyes of the user (i.e. eye coordinates) with respect to the display screen and the sight line vector for a predetermined time period to the identification unit 112.

Based on the sight line information from the analyzing unit 111, the identification unit 112 calculates the number of times that the line of sight of the user is directed to the display screen per unit time (i.e. number of times a movement occurs), and the average time for which the line of sight of the user is directed to the display screen for a unit time (hereinafter referred to as average stay time) to provide observation condition information indicating the condition of the user viewing the display region.

More specifically, to determine the number of times that a movement occurs per unit time, the identification unit 112 counts the number of times the line of sight moves from outside the display screen to within the display screen per unit time based on the sight line information provided by the analyzing unit 111 in regular intervals. It may determine whether the line of sight is directed to the display screen in the following manner.

For example, the identification unit 112 determines that the line of sight is directed to the display screen when the positions of the eyes (i.e. eye coordinates) contained in the sight line information are those corresponding to the eyes viewing the display image and the direction of the sight line vector is directed to the display screen. It should be noted that the identification unit 112 determines that the line of sight is directed to outside the display screen even when the positions of the eyes (i.e. eye coordinates) are those corresponding to the eyes viewing the display screen if the direction of the sight line vector is not directed to the display screen or the positions of the eyes (i.e. eye coordinates) are not those corresponding to the eyes viewing the display screen.

In these cases, for example, the analyzing unit 111 may determine eye coordinates (i.e. reference eye coordinates) from analysis image signals obtained by capturing an image when the user is actually viewing the display screen, and these coordinates may be stored in memory. The identification unit 112 may determine whether the eye coordinates contained in the sight line information indicate the positions corresponding to the eyes viewing the display screen with respect to the reference eye coordinates.

The identification unit 112 further determines the time from the point at which the line of sight moves into the display screen until it moves outside the display screen (hereinafter referred to as stay time) based on analysis image signals. Then, the identification unit 112 calculates the average of stay times, each for a unit time, as an average stay time.

The signal input unit 113 acquires image signals for display supplied from outside (hereinafter referred to as display image signals) and provides them to the display control unit 12 and display unit 13.

Figure 2:
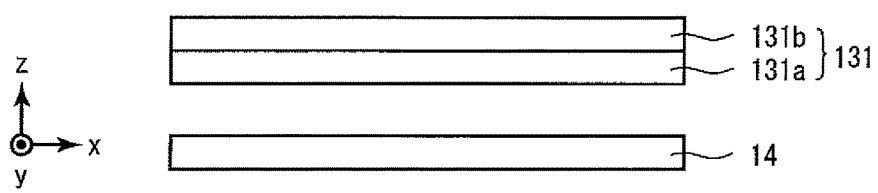
FIG. 2 is a schematic view of the display panel of FIG. 1.

The display unit 13 will be described below. The display unit 13 includes a display panel driver 130 and a display panel 131. As shown in FIG. 2, the display panel 131 includes an active-matrix substrate 131*a* that passes light, a counter-substrate 131*b*, and a liquid crystal layer (not shown) sandwiched therebetween. Although not shown in FIG. 2, a common electrode (not shown) and color filters (not shown) are provided on the side of the counter-substrate 131*b* that is adjacent to the liquid crystal layer (not shown). A polarizer (not shown) is provided on the front side (positive along the Z axis) of the counter-substrate 131*b*, and another one is provided on the back side (negative along the Z axis) of the active-matrix substrate 131*a*.

A backlight 14 is located adjacent the back side (negative along the Z axis) of the active-matrix substrate 131*a*. Light emitted from the backlight 14 passes through the display panel 131 and is emitted through the front side (positive along the Z axis) of the display panel 131, that is, the side of the display screen that is viewed.

Figure 3:
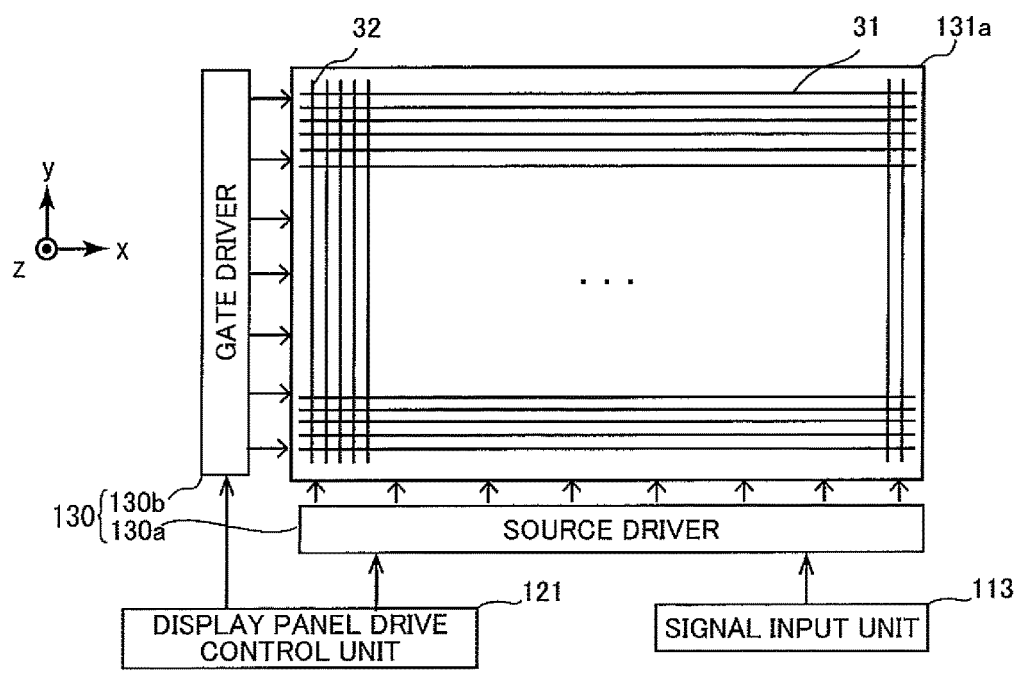
FIG. 3 is a schematic view of the active-matrix substrate of FIG. 2 and various components for driving the active-matrix substrate.

The active-matrix substrate 131*a* and components for driving the active-matrix substrate 131*a* will be described below. FIG. 3 is a schematic view of the active-matrix substrate 131*a* and various components for driving the active-matrix substrate 131*a*.

The active-matrix substrate 131*a* includes a plurality of gate lines 31 and a plurality of source lines 32 disposed to cross the gate lines 31. The display screen is composed of pixels formed by these gate lines 31 and source lines 32.

Figure 4A:
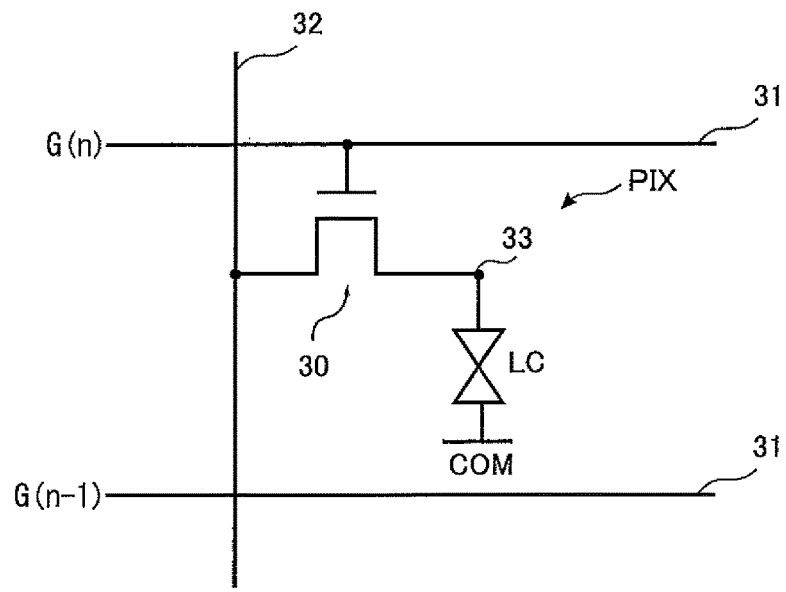
FIG. 4A is an equivalent circuit of one pixel.

The construction of a pixel will be described below. FIG. 4A is an example equivalent circuit of one pixel. As shown in FIG. 4A, the pixel PIX includes a thin-film transistor (TFT) 30 located near the intersection of a gate line 31: G(n) and source line 32, and a pixel electrode 33 connected with the TFT 30. The TFT 30 includes a gate terminal 1312 (see FIG. 4B) connected with the gate line 31, a source terminal 1316 (see FIG. 4B) connected with the source line 32, and a drain terminal 1315 (see FIG. 4B) connected with the pixel electrode 33. The pixel PIX includes a liquid crystal capacitor LC formed by the pixel electrode 33, a common electrode (COM) provided on the counter-substrate 131*b* and the liquid crystal layer (not shown).

Figure 4B:
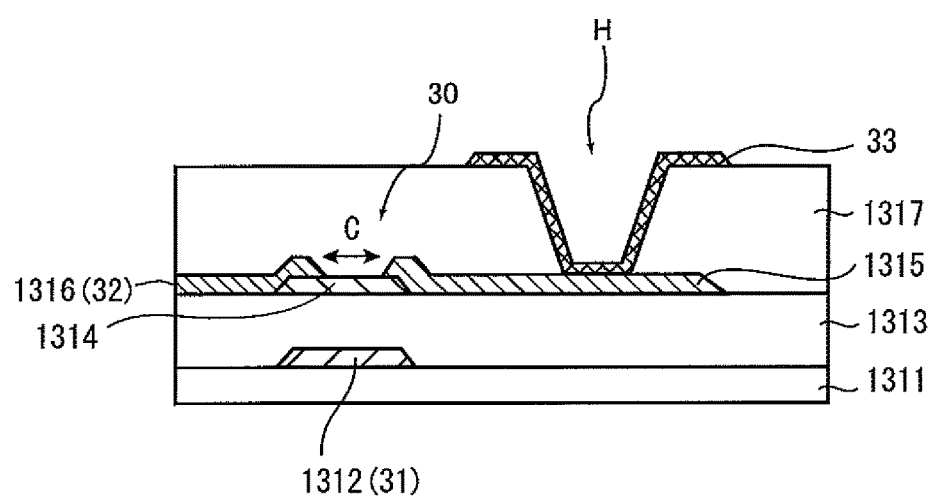
FIG. 4B is a schematic cross-sectional view of the pixel of FIG. 4A.

FIG. 4B is a schematic cross-sectional view of the pixel PIX. The active-matrix substrate 13 includes a glass substrate 1311 and a gate line layer 1312 provided above the glass substrate. As the gate line layer 1312 is formed, the gate line 31 and the gate terminal of the TFT 30 are integrally formed. A gate insulating film 1313 is provided on the gate line layer 1312. A semiconductor layer 1314 is provided above the gate line layer 1312, where the gate insulating film 1313 is located therebetween. A source line layer 1316 and the drain terminal 1315 of the TFT 30 are provided above the gate line layer 1312, where the gate insulating film 1313 is located therebetween, the source line layer and drain terminal located on the top of the semiconductor layer 1314 and spaced apart from each other. Thus, a channel region C is provided above the semiconductor layer 1314. As the source line layer 1316 is formed, the source line 32 and the source terminal of the TFT 30 are integrally formed. A protection layer 1317 formed of an insulating film such as SiO2 is provided on the source line layer 1316, channel region C and drain terminal 1315. Above the protection layer 1317 is provided a pixel electrode 33 connected with the drain terminal 1315 via a contact hole H in the protection layer 1317.

In the present embodiment, the semiconductor layer 1314 may be, for example, an indium (In)-gallium (ga)-zinc (Zn)-oxide (O)-based oxide semiconductor layer. The semiconductor layer 1314 contains an In—Ga—Zn—O-based semiconductor. The In—Ga—Zn—O-based semiconductor is a ternary oxide of In, Ga and Zn, where the ratio of In, Ga and Zn (i.e. composition ratio) is not limited to any particular value. For example, In:Ga:Zn=2:2:1, In:Ga:Zn=1:1:1, In:Ga:Zn=1:1:2 may be used. The semiconductor layer 1314 in the present embodiment uses an In—Ga—Zn—O-based semiconductor that contains In, Ga and Zn in a ratio of 1:1:2. The TFT 30 having a semiconductor layer 1314 containing an In—Ga—Zn—O-based semiconductor has a mobility that is at least about 20 times as large as a TFT using a-Si and a leak current that is smaller than about one hundredth of that of a TFT using a-Si, and thus can be suitably used as a TFT for driving a pixel. Using in the display device 1 TFTs 30 having a semiconductor layer 1314 containing an In—Ga—Zn—O-based semiconductor significantly reduces the power consumption of the display device 1.

The In—Ga—Zn—O-based semiconductor may be amorphous, or may contain a crystalline substance and thus be crystalline. One preferable crystalline In—Ga—Zn—O-based semiconductor is a crystalline In—Ga—Zn—O-based semiconductor with a c axis that is oriented to be generally perpendicular to the layer plane. A crystalline structure of such an In—Ga—Zn—O-based semiconductor is disclosed in JP 2012-134475 A, for example. JP 2012-134475 A is incorporated by reference herein in its entirety.

The semiconductor layer 1314 may include, instead of an In—Ga—Zn—O-based semiconductor, other oxide semiconductors. More specifically, the semiconductor layer 1314 may include, for example, a Zn—O-based semiconductor (ZnO), an In—Zn—O-based semiconductor (IZO (registered trademark)), a Zn-titanium (Ti)—O-based semiconductor (ZTO), a cadmium (Cd)-germanium (Ge)—O-based semiconductor, a Cd-lead (Pb)—O-based semiconductor, cadmium oxide (CdO)-magnesium (Mg)—Zn—O-based semiconductor, an In-tin (Sn)—Zn—O-based semiconductor (for example, In 2O3-SnO2-ZnO), or In-gallium (Ga)—Sn—O-based semiconductor.

Returning to FIG. 3, based on a clock signal and common electrode drive signal supplied by the display panel drive control unit 121, described below, the display panel driver 130 applies a predetermined common electrode voltage to the common electrode (not shown) provided on the counter-substrate 131*b*. The display panel driver 130 further includes a source driver 130*a* and a gate driver 130*b*. The gate driver 130*b* is electrically connected with the gate lines 31 and the source driver 130*a* is electrically connected with the source lines 32.

The gate driver 130*b* receives a drive control signal including a clock signal, a start pulse signal and a stop control signal from the display panel drive control unit 121, described below. Based on the drive control signal, the gate driver 130*b* successively provides an H-level voltage signal for selecting a gate line 31 (hereinafter referred to as select voltage signal) or an L-level voltage signal for making a gate line 31 non-selected (hereinafter referred to as non-select voltage signal) to the gate lines 31. A select voltage signal being supplied to a gate line 31 will also be hereinafter referred to as driving of the gate line 31.

The source driver 130*a* is electrically connected with the signal input unit 113. The source driver 130*a* generates a data signal that is obtained by converting a gray-scale value for each color contained in a display image signal supplied by the signal input unit 113 to a voltage value. The source driver 130*a* receives a drive control signal including a clock signal, a start pulse signal and a stop control signal from the display panel drive control unit 121, described below. The drive control signal for the gate driver 130*b* and the drive control signal for the source driver 130*a* are synchronized. Based on the associated drive control signal, the source driver 130*a* provides, to the source lines 32, data signals to be written to pixels in the timing in which gate lines 31 are scanned.

Returning to FIG. 1, the backlight 14 includes a plurality of light-emitting diodes (LEDs). The backlight 14 is electrically connected with a backlight drive control unit 122, described below. The backlight 14 turns LEDs on at a luminance as indicated by backlight drive control unit 122.

The display control unit 12 includes a display panel drive control unit 121 and a backlight drive control unit 122. The display panel drive control unit 121 is electrically connected with the display panel driver 130. The display panel drive control unit 121 controls the display panel driver 130 to display an image on the display panel 131 according to a display control pattern corresponding to the observation condition information identified by the identification unit 112. The backlight drive control unit 122 controls the luminance of the backlight 14 according to a display control pattern corresponding to the observation condition information identified by the identification unit 112.

Figures 5, 6:
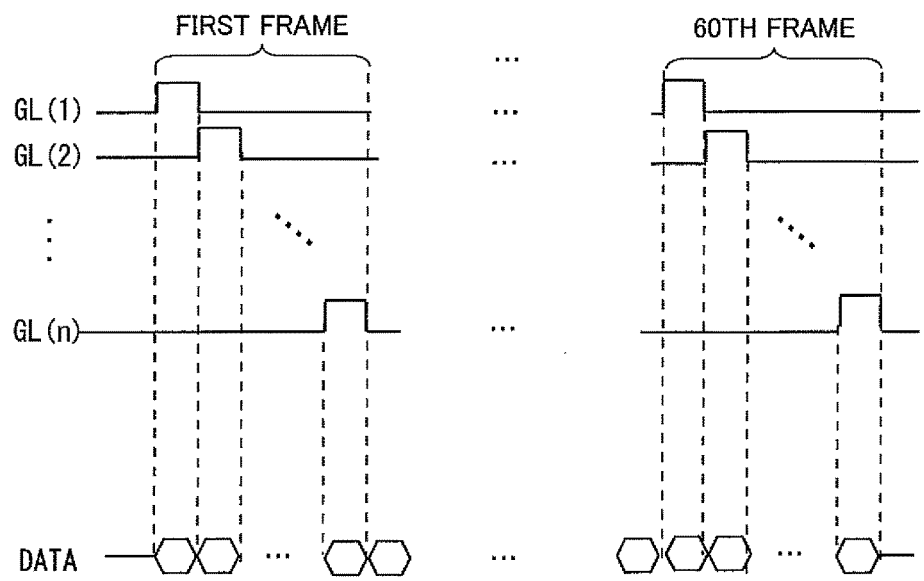
FIG. 5 illustrates the correspondence between the observation condition information and display control pattern in the first embodiment.
FIG. 6 is a timing chart illustrating how data signals are written when the normal control in the first embodiment is performed.

Observation condition information corresponding to a display control pattern will be described. FIG. 5 illustrates the correspondence between the display control pattern in the present embodiment and the observation condition information (i.e. number of times the line of sight moves per unit time (M) and average stay time (T)). In this example, the display control pattern may be one of Patterns A to D. As shown in FIG. 5, Pattern A is performed when the observation condition information meets the requirement $1 \leq M \leq 3$ and $5 < T \leq 60$ (seconds). Pattern B is performed when the observation condition information meets the requirement $1 \leq M \leq 3$ and $0 \leq T \leq 30$ (seconds). Pattern C is performed when the observation condition information meets the requirement $1 \leq M \leq 2$ and $0 \leq T \leq 10$ (seconds). Pattern D is performed when the observation condition information meets the requirement $M=1$ and $0 \leq T \leq 5$ (seconds). In FIG. 5, the smaller the number of times the line of sight moves and the average stay time, the less likely the user is to view the display screen; the larger the number of times the line of sight moves and the average stay time, the more likely the user is to view the display screen.

When the observation condition information identified by the identification unit 112 meets one of the requirements shown in FIG. 5, the display panel drive control unit 121 and backlight drive control unit 122 performs display controls based on the display control pattern corresponding to that requirement. When the observation condition information identified by the identification unit 112 does not meet any of the requirements shown in FIG. 5, that is, when the number of times the line of sight moves per unit time (M) is 4 or larger or the average stay time of the line of sight (T) is larger than 60 seconds, the display panel drive control unit 121 and backlight drive control unit 122 performs a normal control. Controls by the display panel drive control unit 121 and backlight drive control unit 122 will be described below.

The display panel drive control unit 121 provides a common electrode drive signal and a drive control signal to the display panel driver 130. When the observation condition information meets one of the requirements shown in FIG. 5, the display panel drive control unit 121 provides a stop control signal to the source driver 130*a* and gate driver 130*b* according to the display control pattern corresponding to that requirement to perform display controls to halt, for a predetermined time period, writing of data signals in part of the display screen or in the entire display screen. In the present embodiment, for example, when a data signal of a display image signal is to be written to the display panel 131 at 60 Hz, display controls are performed at 1 Hz. The normal control and the display controls based on the display control patterns, i.e. Patterns A to D, will be described below.

The normal control will be discussed first. FIG. 6 is a timing chart illustrating how data signals are written when the normal control is performed. FIG. 6 illustrates an implementation where gate lines 31: G(1) to G(n) are provided on the active-matrix substrate 131*a*.

The display panel drive control unit 121 provides the clock signal and common electrode drive signal to the display panel driver 130, and uses the display panel driver 130 to apply a predetermined common electrode voltage to the common electrode (not shown). The backlight drive control unit 122 turns the backlight 14 on at a predetermined luminance. For each of the first to 60th frames, the display panel drive control unit 121 provides the clock signal, start pulse signal and L-level stop control signal as drive control signals to the gate driver 130*b* and source driver 130*a*. As such, as shown in FIG. 6, the gate lines 31: G(1) to G(n) successively receive the H-level select voltage signal from the gate driver 130b such that all the gate lines 31 are successively driven. Then, data signals are provided to the source lines 32 from the source driver 130a in synchronization with the timing in which the gate lines 31: G(1) to G(n) are driven.

Thus, the liquid crystal capacitance LC of each pixel PIX changes depending on the voltage of a data signal applied via the TFT 30 such that data signals are written in the entire display region for each frame. Thus, according to the normal control, an image corresponding to a data signal is displayed on the display screen for each of the first to 60th frames.

Writing of data signals under the display control based on Pattern A will be described below. The display control based on Pattern A halts, for a predetermined time period, writing of data signals in a display region for a static image contained in an image represented by display image signals (hereinafter referred to as static image region), and turns the backlight 14 on at the predetermined luminance, equal to that for the normal control.

Figure 7A:
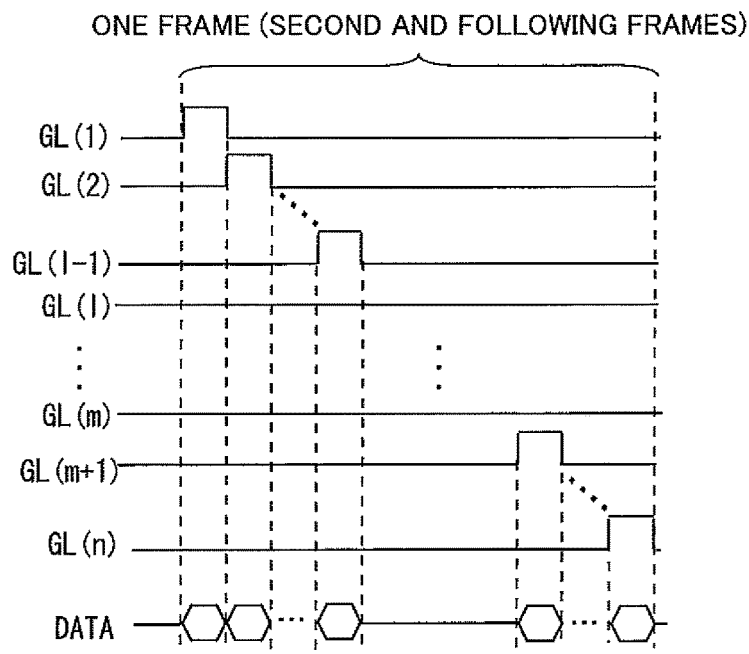
FIG. 7A is a timing chart illustrating how data signals are written when the display control for Pattern A of FIG. 5 is performed.
Figure 7B:
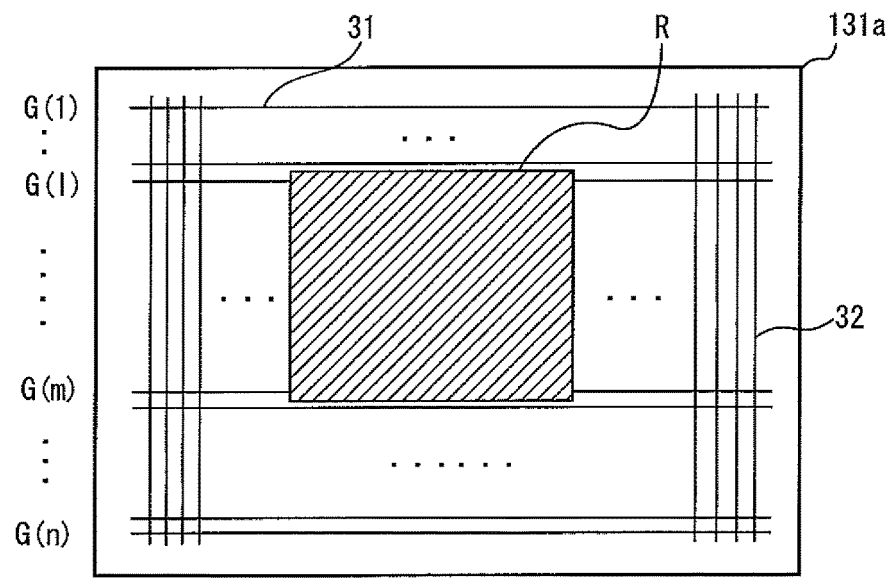
FIG. 7B is a schematic view of an example static image region on the active-matrix substrate.

FIG. 7A is a timing chart illustrating how data signals are written when the display control for Pattern A is performed. FIG. 7B is a schematic view of an example static image region on the active-matrix substrate 131a. In the implementation of FIG. 7B, the static image region is defined by a rectangle R (hereinafter referred to as static image region R), where parts of gate lines 31: G(1) to G(m) are located in the static image region R.

As discussed above, in the present embodiment, the display panel drive control unit 121 writes data signals to the display panel 131 at 60 Hz, and performs the display control based on Pattern A at 1 Hz. As is the case with the normal control shown in FIG. 6, for the first frame, the display panel drive control unit 121 successively drives all the gate lines 31: G(1) to G(n), and provides data signals to the source lines 32 in synchronization with the timing in which the gate lines 31 are driven. Thus, for the first frame, data signals are written in the entire display region.

For each of the second to 60th frames, the display panel drive control unit 121 provides an H-level stop control signal to the gate driver 130b and source driver 130a in the timing in which the gate lines 31: G(1) to G(m) partially located in the static image region R are scanned, and provides an L-level stop control signal in the timing in which the other gate lines 31 are scanned.

For each of the second to 60th frames, the gate driver 130b provides a non-select voltage signal to the gate lines 31: G(1) to G(m) in the timing in which the gate lines 31: G(1) to G(m) are scanned to which an H-level stop control signal is provided from the display panel drive control unit 121, and provides a select voltage signal in the timing in which the other gate lines 31 are scanned to which an L-level stop control signal is provided from the display panel drive control unit 121. The source driver 130a provides data signals to the source lines 32 in the timing in which those gate lines 31 are scanned that are other than the gate lines 31: G(1) to G(m) to which an L-level stop control signal is provided from the display panel drive control unit 121.

Thus, as shown in FIG. 7A, for each of the second and following frames, the gate lines 31: G(1) to G(m) are not driven, and the gate lines 31 that are other than the gate lines 31: G(1) to G(m) are successively driven and data signals are provided to the source lines 32 in the timing in which the other gate lines 31 are driven. As such, no data signal is written in the static image region R for the second to 60th frames, while data signals are written in the portion of the display region that is other than the static image region R for each frame.

Since a static image has less movement than a moving image, visibility is unlikely to decrease even if writing of data signals for the static image region R is halted for the second to 60th frames. Further, as shown in FIG. 5, the observation condition information corresponding to Pattern A indicates that the user is not watching the display screen continuously for an extended period of time, but sometimes glances at the display screen; since an image is displayed on the display screen even when the display control based on Pattern A is performed, the user is less likely to notice something odd than in implementations where no image is displayed when the user views the display screen, and convenience is not impaired, either. Further, as writing of data signals for the static image region R is halted for a predetermined frame period, power consumption encountered while an image is displayed on the display panel 131 is smaller than when the normal control is performed.

The static image region R may be identified in the following manner: for each frame of a display image signal supplied from the signal input unit 113, the display panel drive control unit 121 may determine the difference between this frame and the preceding frame, and identify the portion of the display region for which no difference was detected as the static image region R. Further, for each frame of a display image signal, the signal input unit 113 determines the difference between this frame and the preceding frame. The signal input unit 113 may provide, to the display panel drive control unit 121, static image information indicating a coordinate range corresponding to a static image region for which a detected difference is below a threshold, or provide, to the display panel drive control unit 121, non-static image information indicating a coordinate range corresponding to a non-static image region for which a detected difference is not smaller than a threshold. When static image information is provided by the signal input unit 113, the display panel drive control unit 121 performs the display control based on Pattern A for the static image region indicated by the static image information. When non-static image information is provided by the signal input unit 113, the display panel drive control unit 121 designates the portion of the display region that is other than the non-static image region indicated by the non-static image information as a static image region, and performs the display control based on Pattern A.

The display control based on Pattern B will now be described. The display control based on Pattern B halts writing of data signals for a predetermined time in the entire display region, and turns the backlight 14 on at a predetermined luminance.

As is the case with the normal control shown in FIG. 6, for the first frame, the display panel drive control unit 121 successively drives all the gate lines 31: G(1) to G(n), and provides data signals to the source lines 32 in the timing in which the gate lines 31: G(1) to G(n) are driven. Thus, for the first frame, data signals are written in the entire display region.

Figure 8:
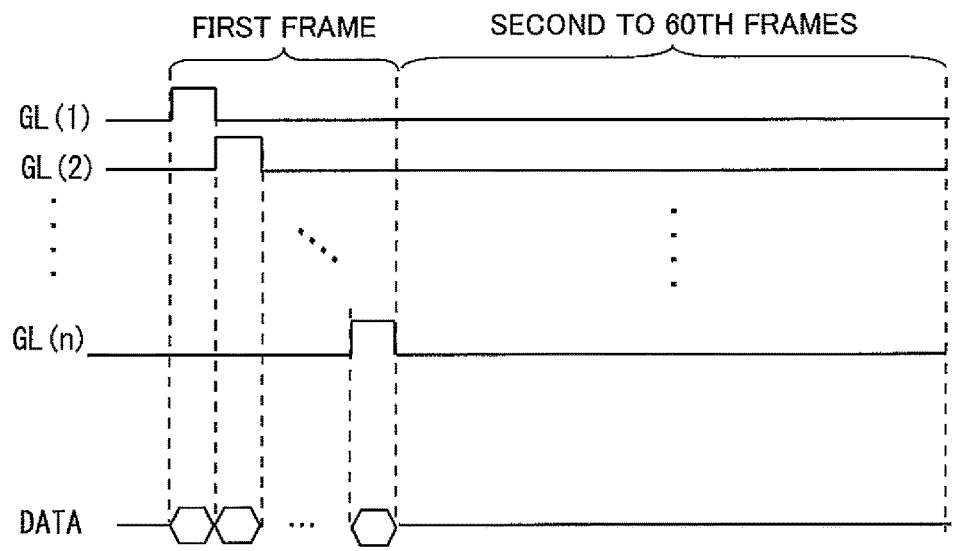
FIG. 8 is a timing chart illustrating how data signals are written when the display control for Pattern B of FIG. 5 is performed.

For the second to 60th frames, the display panel drive control unit 121 provides an H-level stop control signal to the gate driver 130b and source driver 130a to stop providing of start pulse signals. Thus, as shown in FIG. 8, for the second to 60th frames, scanning of all the gate lines 31: G(1) to G(n) is halted, and no data signal is supplied to the source lines 32. Thus, according to Pattern B, the image represented by the data signals written for the first frame remains displayed for the second to 60th frames.

Since a moving image has more movement than a static image, the visibility of images displayed on the display screen decreases as writing of data signals is halted for the second to 60th frames. However, as shown in FIG. 5, the observation condition information corresponding to Pattern B has a shorter average stay time during which the user views the display screen than that for Pattern A. Further, an image remains displayed on the display screen even when writing of data signals for the entire display image is halted for a predetermined frame period. Thus, the user is less likely to notice something odd than in implementations where no image is displayed when the user is viewing the display screen, and convenience is not impaired, either. Further, power consumption encountered while an image is displayed on the display panel 131 is smaller than when writing of data signals for only a part of the display region is halted, as is the case with Pattern A.

Figure 9:
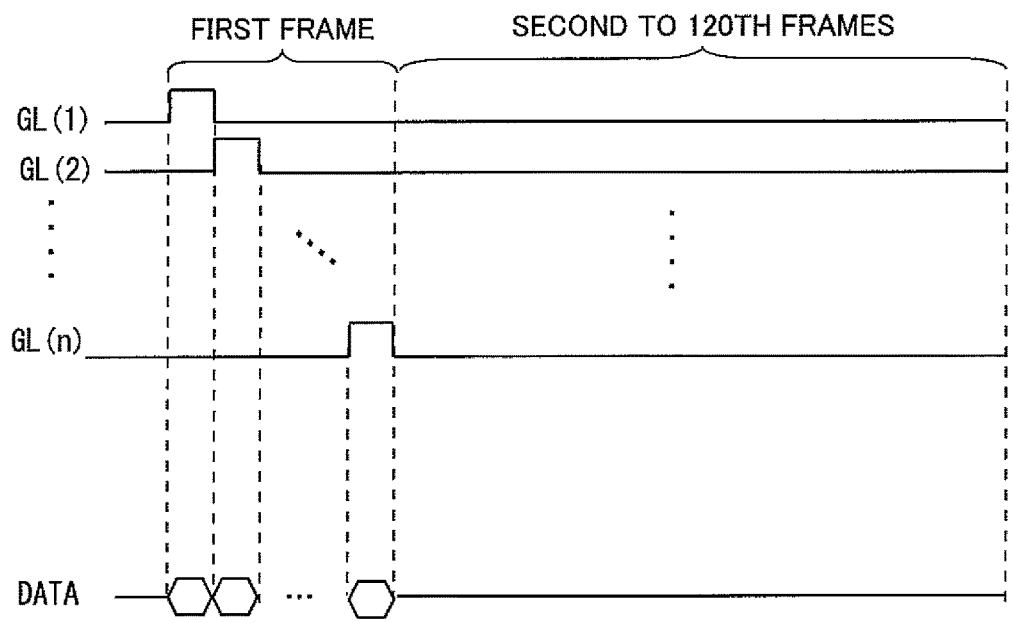
FIG. 9 is a timing chart illustrating how data signals are written when the display control for Pattern C of FIG. 5 is performed.

The display control based on Pattern C will now be described. The display control based on Pattern C performs the display control based on Pattern B at 0.5 Hz. As is the case with Pattern B, for the first frame, the display panel drive control unit 121 successively drives all the gate lines 31: G(1) to G(n) to provide data signals to the source lines 32. Thus, for the first frame, data signals are written in the entire display region. Then, for each of the second to 120th frames, the display panel drive control unit 121 provides an H-level stop control signal to the gate driver 130b and source driver 130a to stop providing of start pulse signals. Thus, as shown in FIG. 9, for the second to 120th frames, scanning of all the gate lines 31: G(1) to G(n) is halted and no data signal is provided to the source lines 32. Thus, according to Pattern C, the image represented by the data signals written for the first frame remains displayed for the second to 120th frames.

According to Pattern B, data signals are written in the entire display screen once per 60 frames, while according to Pattern C, data signals are written in the entire display screen once per 120 frames. As such, the visibility of images is smaller than that for Pattern B. However, as shown in FIG. 5, the observation condition information corresponding to Pattern C has a smaller number of times the user moves his line of sight to the display screen and a shorter average stay time than those for Pattern B. Further, an image is also displayed on the display screen according to Pattern C, the user is less likely to notice something odd than when no image is displayed on the display screen when the user is viewing the display screen, and convenience is not impaired, either. Furthermore, Pattern C has a longer time during which writing of data signals is halted than Pattern B such that power consumption encountered while an image is displayed is smaller than that for Pattern B.

The display control based on Pattern D will be described below. Starting from the display control based on Pattern C, the display control based on Pattern D turns the backlight 14 on at a luminance that is smaller than the predetermined luminance. That is, according to Pattern D, the display panel drive control unit 121 writes data signals in the entire display screen once for 120 frames, and the backlight drive control unit 122 turns the backlight 14 on at the predetermined luminance minus a certain amount.

As the luminance of the backlight 14 is smaller than that for Pattern C, the visibility of the display screen decreases. However, as shown in FIG. 5, the observation condition information of Pattern D indicates that the user is hardly viewing the display screen. An image is displayed on the display screen even when the display control based on Pattern D is performed, and thus the user is less likely to notice something odd when viewing the display screen than in implementations where no image is displayed on the display screen, and convenience is not impaired, either. Furthermore, according to Pattern D, the backlight 14 is turned on at a smaller luminance than according to Pattern C such that power consumption is smaller than according to Pattern C.

In the present embodiment, an H-level stop control signal is provided to the source driver 130a and gate driver 130b to perform idled driving where the operations of the driving circuits, i.e. the source driver 130a and gate driver 130b for driving the display panel 131 are halted for the second to 60th frames (i.e. idled period); alternatively, an H-level stop control signal may be provided to one of the source driver 130a and gate driver 130b to halt the operation of one driving circuit for the idled period.

In the first embodiment described above, the display device 1 identifies observation condition information indicating the condition of the user viewing the display screen based on results of analyzing analysis image signals obtained by picturing the user. Then, the display device 1 writes display image signals to the display panel 131 for each frame according to the display control pattern corresponding to the observation condition information. That is, display image signals are written in a manner that depends on the condition of the user viewing the display screen. Thus, even when the user sometimes glances at the display screen, power consumption encountered while an image is displayed is reduced without decreasing the visibility of the display screen or convenience.

<Second Embodiment>

Figures 10, 11A:
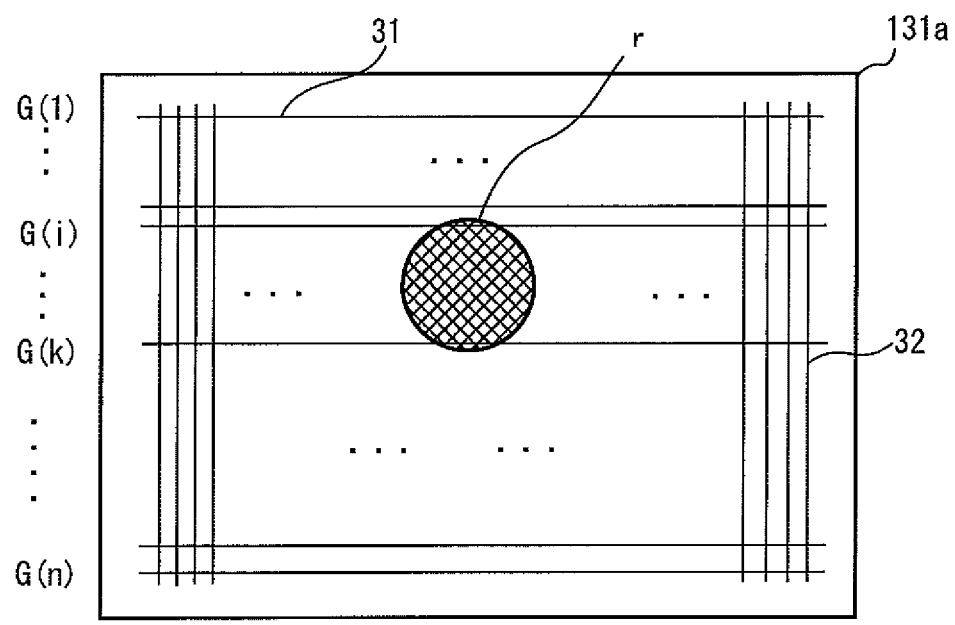
FIG. 10 illustrates the correspondence between the observation condition information and display control pattern in a second embodiment.
FIG. 11A is a schematic view of an example predetermined range on the active-matrix substrate for Pattern E of FIG. 10.

The present embodiment describes an implementation where writing of image signals is halted according to display control patterns that are different from those of the first embodiment. The differences from the first embodiment will be described below. FIG. 10 illustrates the correspondence between the observation condition information and display control pattern in the present embodiment. In FIG. 10, Patterns A to C are the same as in the first embodiment. The present embodiment is different from the first embodiment in that Pattern D is not provided as a display control pattern and Pattern E is additionally provided in addition to Patterns A to C.

In this implementation, Pattern E is performed when the observation condition information meets the requirement $1 \leq M \leq 3$ and $5 < T \leq 60$ (seconds). Pattern A of the present embodiment is performed when the observation condition information meets the requirement $1 \leq M \leq 3$ and $0 \leq T \leq 30$ (seconds). Pattern B of the present embodiment is performed when the observation condition information meets the requirement $1 \leq M \leq 2$ and $0 \leq T \leq 10$ (seconds). Pattern C of the present embodiment is performed when the observation condition information meets the requirement $M=1$ and $0 \leq T \leq 5$ (seconds).

The display control based on Pattern E halts writing of data signals for a predetermined frame period in the portions of the display region that are other than a specified display region. That is, the display control based on Pattern E writes data signals in the specified display region for each frame, as is the case with the normal control, and writes data signals in the other display region portions according to a display control pattern corresponding to the observation condition information. The specified display range is a viewed range within the display region that can be arbitrarily defined with respect to an observed position on the display screen that the user is viewing.

Based on analysis results from the analyzing unit 111 as well as the observation condition information, the identification unit 112 identifies an observed position on the display screen to which the line of sight of the user is directed. In the present embodiment, the identification unit 112 identifies, for example, the sight line vector with the longest stay time of the line of sight for a unit time and the positions of the eyes (i.e. eye coordinates) found when this sight line vector is obtained. Then, the identification unit 112 determines the coordinates of the observed position by, for example, substituting the identified eye coordinates and sight line vector into a predetermined arithmetic expression that has eye coordinates and sight line vector as variables and specifies a position on the display region. The identification unit 112 identifies a predetermined range with respect to the coordinates of the observed position as an observed range. This observed range may be defined by coordinates on a circumference with an arbitrary diameter with respect to the observed position, for example. The identification unit 112 provides the identified observed range and the number of times the line of sight moves and the average stay time to the display panel drive control unit 121.

When the display control pattern corresponding to the number of times the line of sight moves and the average stay time is Pattern E, the display panel drive control unit 121 provides drive control signals to the display panel driver 130 so as to successively drive the gate lines 31 partially located within the observed range identified by the identification unit 112 for each frame, and to halt scanning of the other gate lines 31 for the second to 60th frames.

For example, an example display control based on Pattern E will be described where, on the active-matrix substrate 131a shown in FIG. 11A, an observed range defined by a circle r (i.e. observed range r) is identified by the identification unit 112, and the gate lines 31: G(i) to G(m) are partially located in the observed range r. As is the case with the normal control shown in FIG. 6, for the first frame, the display panel drive control unit 121 successively drives the gate lines 31: G(1) to G(n) to provide data signals to the source lines 32.

For the second to 60th frames, the display panel drive control unit 121 provides an L-level stop control signal to the gate driver 130b and source driver 130a in the timing in which the gate lines 31: G(i) to G(k) partially located in the observed range r are scanned. Further, for the second to 60th frames, the display panel drive control unit 121 provides an H-level stop control signal in the timing in which the other gate lines 31 are scanned.

For each of the second to 60th frames, the gate driver 130b provides a select voltage signal to the gate lines 31: G(i) to G(k) in the timing in which the gate lines 31: G(i) to G(k) are scanned. Further, for each of the second to 60th frames, the gate driver 130b provides a non-select voltage signal to the other gate lines 31 in the timing in which the gate lines 31 that are other than the gate lines 31: G(i) to G(k) are scanned.

Figure 11B:
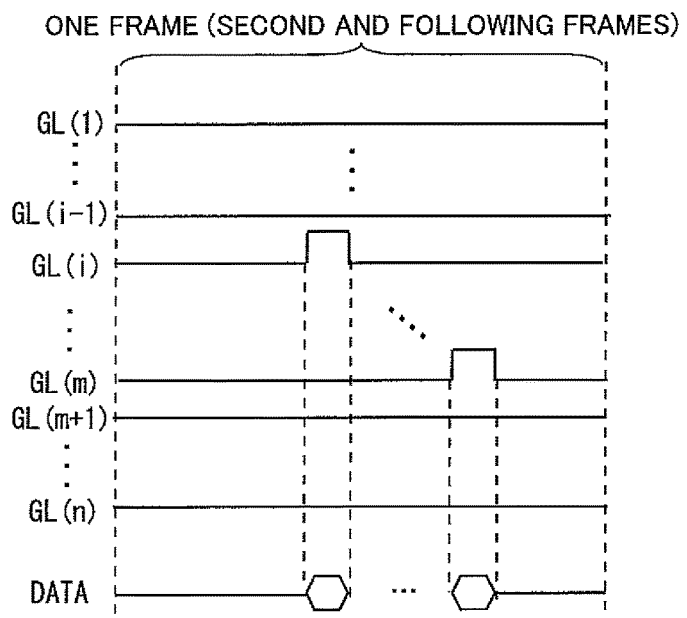
FIG. 11B is a timing chart illustrating how data signals are written when the display control for Pattern E of FIG. 10 is performed.

The source driver 130a provides data signals to the source lines 32 in the timing in which the gate lines 31: G(i) to G(k) are scanned. Then, the source driver 130a halts providing of data signals to the source lines 32 in the timing in which the other gate lines 31 are scanned. Thus, as shown in FIG. 11B, for each of the second to 60th frames, data signals are provided in the timing in which the gate lines 31: G(i) to G(k) are successively driven. Thus, data signals are written in the observed range r for each frame, while data signals are written in the portions of the display region that are other than the observed range r only for the first frame, and no data signal is written for the second to 60th frames.

As shown in FIG. 10, Pattern E indicates that the user sometimes glances at the display screen. Thus, the visibility of the portion of the image that the user views is maintained as data signals are written in the observed range viewed by the user for each frame. Thus, even when writing of data signals in the portions of the display region that are other than the observed range viewed by the user is halted for a predetermined frame period, the user is unlikely to notice something odd, and convenience is not impaired, either. Further, power consumption encountered while an image is displayed on the display screen is smaller than in implementations where the normal control is performed.

While embodiments of the present invention have been described, these embodiments are merely examples used to carry out the present invention. Thus, the present invention is not limited to these embodiments, and the embodiments can be varied as appropriate without departing from the spirit of the invention. Variations of the present invention will be described below.

<Variations>

(1) In each of the first and second embodiments described above, the identification unit 112 identifies a number of times the line of sight moves per unit time (M) and an average stay time (T) as observation condition information; alternatively, one of a number of times a movement occurs (M) and an average stay time (T) may be identified as observation condition information. Further, the identification unit 112 may identify, instead of an average stay time (T), the sum of stay times of the line of sight within a unit time.

(2) In the first embodiment described above, the display control based on Pattern D starts from the display control based on Pattern C and controls the backlight 14 to have the predetermined luminance minus a certain amount; alternatively, for example, it may start from the display controls based on Patterns A, B and C and control the backlight 14 to have the predetermined luminance minus an amount that increases as the number of times a movement occurs or the average stay time decrease for Patterns A, B and C.

More specifically, when the observation condition information corresponding to Pattern A in FIG. 5 is M=3 and 30<T≤60 (seconds), the backlight drive control unit 122 controls the backlight 14 to have a predetermined luminance (hereinafter referred to as first luminance). For M=2 or 10<T≤30 (seconds), the backlight drive control unit 122 controls the backlight 14 to have the first luminance minus a certain amount, i.e. a second luminance. Furthermore, for M=1 or 5<T≤10 (seconds), the backlight drive control unit 122 controls the backlight 14 to have the second luminance minus a certain amount, i.e. a third luminance.

In the present variation, the luminance of the backlight 14 may be controlled such that the amount by which the luminance of the backlight 14 is reduced is expressed as Patterns A<B<C. Furthermore, starting from the second embodiment described above, as is the case with the present variation, the controls based on Patterns A, B, C and E may be done and, in addition, the backlight 14 may be controlled to have the predetermined luminance minus a certain amount.

(3) In each of the first and second embodiments described above, a number of times the line of sight moves per unit time (M) and an average stay time (T) are identified as observation condition information, and data signals are written according to the display control pattern corresponding to the observation condition information; alternatively, the display device 1 may use the identification unit 112 to identify an observed position on the display region viewed by the user as observation condition information.

When the movement of the observed position matches a predetermined movement pattern, the display panel drive control unit 121 may halt writing of data signals for a predetermined frame period according to this movement pattern.

Figure 12:
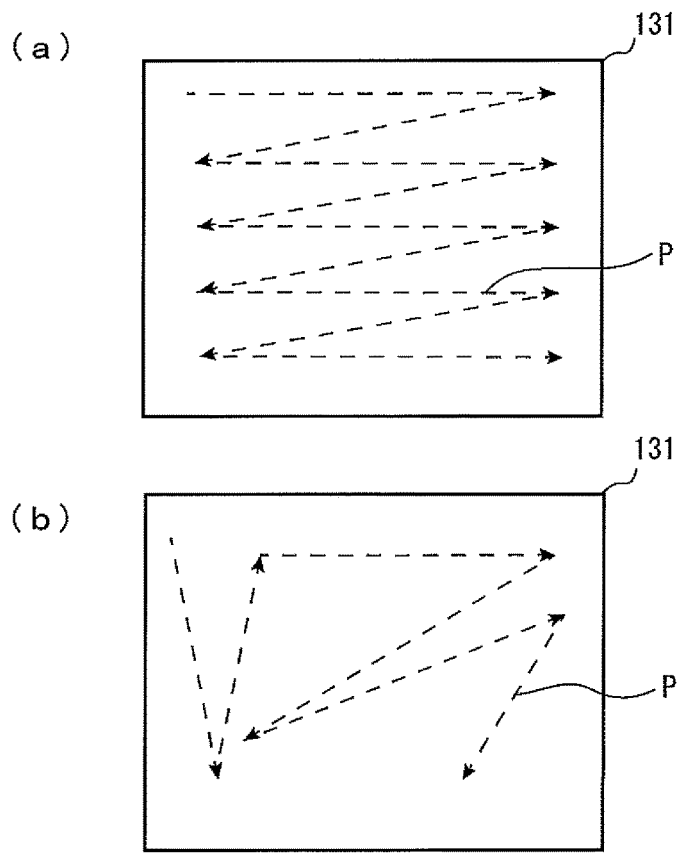
FIG. 12 schematically illustrates how the line of sight of the user moves in Variation (3).

For example, when the user causes the display device 1 to display an image of a book and is reading it, the observed position in the display region to which the line of sight of the user is directed moves regularly, as indicated by the set of broken lines P in FIG. 12(*a*). When the track of the observed position in the display region matches the track indicated by the broken lines P in FIG. 12(*a*), the display panel drive control unit 121 may perform display controls according to the display control pattern of Pattern B, discussed above.

Further, for example, when the user causes the display device 1 to display an image for a game and is doing operations for the game, the observed position of the user randomly moves, as shown by the set of broken lines P in FIG. 12(*b*). When the track of the observed position in the display region matches the track indicated by the broken lines P in FIG. 12(*b*), the display panel drive control unit 121 may perform the normal control.

The identification unit 112 may identify, as observation condition information, not only an observed position on the display region but also a speed of movement of the observed position for a unit time or a range of movement of the observed position, for example. In such cases, the display panel drive control unit 121 may determine that operations for a game are being done when, for example, the movement of the observed position matches the movement pattern of FIG. 12(*b*) and the speed of movement of the observed position is equal to or larger than a predetermined threshold and the range of movement is not smaller than a predetermined range. Further, the display panel drive control unit 121 may acquire from the control unit 11 or an external device a type of application for an image being displayed on the display device 1 and perform display controls as described above according to the type of application and the observation condition information. This arrangement will enable determining the use condition of the user in a more reliable manner than in implementations where the use condition of the user is determined only based on the observation condition information, thereby enabling appropriate display controls depending on the use condition.

(4) In the first and second embodiments described above, idled driving is performed where driving of some or all the gate lines 31 in the display region and supplying of data signals to the source lines 32 are halted for a predetermined frame period. In idled driving, driving of some or all the gate lines 31 in the display region may be halted for a predetermined frame period, or supplying of data signals to the source lines 32 may be halted for a predetermined frame period. Further, in idled driving, supplying of control signals such as a clock signal to the driving circuits (i.e. source driver 130*a* and gate driver 130*b*) whose operation is to be halted may be halted. In short, it is only required that writing of data signals to a part of the display region or the entire display region be halted for a predetermined frame period.

INDUSTRIAL APPLICABILITY

The present invention is industrially useful as a display device for a television set or personal computer.

The invention claimed is:

1. A display device comprising:
a display unit having a display region in which an image signal is written;
a detection unit configured to analyze an image obtained by picturing a user and detect a line of sight of the user with respect to the display region;
an identification unit configured to identify observation condition information indicating a condition of the user viewing the display region based on the line of sight detected by the detection unit; and
a display control unit configured to write the image signal in the display region for each frame, wherein the display control unit halts, for a predetermined frame period, writing of the image signal in a controlled region when the observation condition information identified by the identification unit meets a predetermined requirement, the controlled region being at least a part of the display region;
wherein the identification unit further identifies a predetermined observed range including an observed position within the display region to which the line of sight of the user is directed, the observation condition information includes at least one of a number of times the line of sight of the user directed to the display region moves per unit time and a time for which the user views the display region within a unit time, the controlled region is a portion of the display region that is other than the predetermined observed range, and the predetermined requirement is the observation condition information having a value equal to or smaller than a predetermined threshold.

2. The display device according to claim 1, wherein the display control unit changes a length of the predetermined frame period depending on the observation condition information.

3. The display device according to claim 1, wherein the controlled region is a static image region of the display region in which a static image contained in an image represented by the image signal is displayed.

4. The display device according to, claim 1, wherein:
the observation condition information includes at least one of a number of times the line of sight of the user directed to the display region moves per unit time and a time for which the user views the display region within a unit time, and
the predetermined requirement is the observation condition information having a value equal to or smaller than a predetermined threshold.

5. The display device according to claim 4, further comprising:
a backlight configured to illuminate the display unit with light; and
a backlight control unit configured to reduce a luminance of the backlight when the observation condition information has a value that is equal to or smaller than the predetermined threshold.

6. The display device according to claim 1, wherein:
the observation condition information includes an observed position in the display region to which the line of sight of the user is directed, and
the predetermined requirement is a movement of the observed position within the display region matching a predetermined movement pattern.

7. The display device according to, claim 1, wherein:
the display unit includes an active-matrix substrate,
the active-matrix substrate including:
gate lines and source lines disposed to cross the gate lines;
pixel electrodes each provided for a pixel defined by one of the gate lines and one of the source lines; and
thin-film transistors each having a semiconductor layer provided above one of the gate lines, a gate terminal connected with that gate line, a source terminal connected with one of the source lines, and a drain terminal connected with one of the pixel electrodes, the source terminal and the drain terminal being located above the semiconductor layer and spaced apart from each other.

8. The display device according to claim 7, wherein the semiconductor layer contains an oxide semiconductor.

9. The display device according to claim 8, wherein the oxide semiconductor contains indium, gallium, zinc and oxygen.

10. The display device according to claim 9, wherein the oxide semiconductor is crystalline.

* * * * *